United States Patent
Boyd et al.

(10) Patent No.: US 7,967,282 B2
(45) Date of Patent: Jun. 28, 2011

(54) VIBRATION ISOLATORS

(75) Inventors: James R. Boyd, Glendale, AZ (US);
Dale Thomas Ruebsamen, Glendale, AZ (US); Timothy Hindle, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 426 days.

(21) Appl. No.: 12/256,909

(22) Filed: Oct. 23, 2008

(65) Prior Publication Data
US 2010/0101903 A1    Apr. 29, 2010

(51) Int. Cl.
*F16F 1/38* (2006.01)
(52) U.S. Cl. .............. 267/293; 267/140.13; 267/280
(58) Field of Classification Search .......... 267/140.11, 267/140.13, 140.2–141.7, 280, 281, 293, 267/294
See application file for complete search history.

(56) References Cited

U.S. PATENT DOCUMENTS

| | | | |
|---|---|---|---|
| 4,109,979 A * | 8/1978 | Estaque | 384/582 |
| 4,399,987 A | 8/1983 | Cucelli et al. | |
| 4,711,423 A | 12/1987 | Popper | |
| 4,809,960 A * | 3/1989 | Kakimoto et al. | 267/141 |
| 4,879,857 A | 11/1989 | Peterson et al. | |
| 4,998,592 A | 3/1991 | Londt et al. | |
| 5,058,867 A * | 10/1991 | Hadano et al. | 267/141.3 |
| 5,123,625 A | 6/1992 | Spaltofski | |
| 5,339,580 A | 8/1994 | Koshika et al. | |
| 5,472,226 A * | 12/1995 | Bunker | 280/681 |
| 5,687,948 A * | 11/1997 | Whiteford et al. | 248/635 |
| 5,829,730 A | 11/1998 | Ott | |
| 6,065,742 A * | 5/2000 | Whiteford | 267/140.5 |
| 6,138,980 A | 10/2000 | Farbotnik | |
| 6,450,473 B1 | 9/2002 | Kondo et al. | |
| 6,565,061 B1 | 5/2003 | Petersen et al. | |
| 6,585,222 B2 | 7/2003 | Ihara et al. | |
| 6,742,312 B2 | 6/2004 | Valentine | |
| 2003/0222194 A1 | 12/2003 | Platus | |

* cited by examiner

*Primary Examiner* — Christopher P Schwartz
(74) *Attorney, Agent, or Firm* — Ingrassia Fisher & Lorenz, P.C.

(57) ABSTRACT

Vibration isolators are provided that include a shaft, a first bushing, a second bushing, a first outer annular member, a second outer annular member, a first elastomeric member, a second elastomeric member, and a shim. The first elastomeric member is adapted to provide a first stiffness for damping a first vibration, and the second elastomeric member is adapted to provide a second stiffness for damping a second vibration, the second stiffness being greater than the first stiffness.

19 Claims, 2 Drawing Sheets

VIBRATION ISOLATORS

TECHNICAL FIELD

The inventive subject matter generally relates to isolators, and more particularly relates to vibration isolators having dual stiffness properties.

BACKGROUND

An isolation mount is typically used to isolate a payload (e.g. sensitive component) from unwanted vibrations. The isolation mount may have a break frequency that is selected to be lower than the frequency of the unwanted vibration(s), thereby providing attenuation of the unwanted vibration(s) as it is transmitted through the isolation mount and into the payload. The isolation mount may also damp the vibration such that amplification at a resonant frequency of an isolated system (i.e. payload and isolation mount together) is limited to a desired level.

A spacecraft that includes sensitive payloads may be subjected to a large amplitude vibration environment as it is launched into orbit and in a low amplitude vibration environment once on-orbit. Such payloads can benefit from vibration isolation during the large amplitude launch vibration environment, and may also benefit from vibration isolation once on-orbit to function properly in the low vibration on-orbit environment. Desired properties (e.g. stiffness, damping, break frequency) of an isolation mount for a large amplitude launch vibration environment may not be the same as desired properties of an isolation mount for the low amplitude vibration environment. However, because the isolation system described above are typically sized to have a single specific resonant frequency and damping level and to operate in a single particular vibration environment, they may not adequately operate in both vibration environments.

Accordingly, it is desirable to have a single isolation apparatus has improved capabilities for operating in vibration environment with different amplitudes. In addition, it is desirable for the apparatus to be operable without a supply of power (i.e., passive). Moreover, it is desirable for the apparatus to be relatively inexpensive and simple to manufacture. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Vibration isolators are provided.

In an embodiment, and by way of example only, a vibration isolator includes a shaft, a first bushing, a second bushing, a first outer annular member, a second outer annular member, a first elastomeric member, a second elastomeric member, and a shim. The shaft has a first end and a second end and includes a radial plate extending radially outwardly from the shaft and disposed between the first end and the second end. The first bushing is mounted to the shaft at an axial position between the radial plate and the second end of the shaft. The first bushing has a first end and a second end including a flange extending radially outwardly therefrom. The second bushing is disposed on the shaft and is positioned between the radial plate and the first bushing. The second bushing has a first end, a second end, and an opening extending between the first end and the second end. The first end of the second bushing is spaced apart from the second end of the first bushing to form a first axial gap, the second end includes a flange extending radially outwardly therefrom and is positioned adjacent to the radial plate forming an axial clearance therewith, and the opening has a diameter that is greater than a diameter of the shaft such that a radial gap is formed between the second bushing and the shaft. The first outer annular member is disposed concentric to the first bushing and has an attachment face. The second outer annular member is disposed concentric to the second bushing and has an attachment face that is spaced apart from the attachment face of the second outer annular member to form a second axial gap. The first elastomeric member is disposed concentric to the shaft between the first outer annular member and the first bushing and has a first end and a second end. The first end of the first elastomeric member abuts the flange of the first bushing. The second elastomeric member is disposed concentric to the shaft between the second outer annular member and the second bushing. The second elastomeric member has a first end and a second end. The first end of the second elastomeric member abuts the flange of the second bushing. The shim is disposed between the second end of the first bushing and the second end of the second bushing and between the attachment face of the first outer annular member and the attachment face of the second outer annular member. The shim has a portion having a first thickness and a portion having a second thickness, the first thickness being substantially equal to an axial length of the first axial gap, and the second thickness being substantially equal to an axial length of the second axial gap. The first elastomeric member is adapted to provide a first stiffness for damping a first vibration, and the second elastomeric member is adapted to provide a second stiffness for damping a second vibration, the second stiffness being greater than the first stiffness.

In another embodiment, by way of example only, a vibration isolator includes a haft, two mount sections, and a shim. The shaft has a first end and a second end. The shaft includes a radial plate extending radially outwardly from the shaft and is disposed between the first end and the second end. The first mount section is coupled to the shaft between the radial plate and the second end of the shaft and includes a first bushing, a first outer annular member, and a first elastomeric member. The first bushing is mounted to the shaft at an axial position between the radial plate and the second end of the shaft and has a first end and a second end. The second end of the first bushing includes a flange extending radially outwardly therefrom. The first outer annular member is disposed concentric to the first bushing and has an attachment face. The first elastomeric member is disposed concentric to the shaft between the first outer annular member and the first bushing and has a first end and a second end. The first end of the first elastomeric member abuts the flange of the first bushing. The second mount section is disposed on the shaft between the first mount section and the radial plate and includes a second bushing, a second outer annular member, and a second elastomeric member. The second bushing is disposed on the shaft and is positioned between the radial plate and the first bushing. The second bushing has a first end, a second end, and an opening extending between the first end and the second end, the first end of the second bushing is spaced apart from to the second end of the first bushing to form a first axial gap, the second end includes a flange extending radially outwardly therefrom and positioned adjacent to the radial plate forming an axial clearance therewith, and the opening has a diameter that is greater than a diameter of the shaft such that a radial gap is formed between the second bushing and the shaft. The second outer annular member is disposed concentric to the second bushing and has an attachment face that is spaced apart from the attachment face of the second outer annular member to form a second axial gap. The second elastomeric member is disposed concentric to the shaft between the second outer annular member and the second bushing, the second elastomeric member has a first end and a second end, and the first end of the second elastomeric member abuts the flange of the second bushing. The shim is disposed between the second end of the first bushing and the second end of the second bushing and between the attachment face of the first outer annular member and the attachment face of the second outer annular member and has a portion having a first thickness and a portion having a second thickness, the first thickness being substantially equal to an axial length of the first axial gap, and the second thickness being substantially equal to an axial length of the second axial gap. The first elastomeric member is adapted to provide a first stiffness, and the second elastomeric member is adapted to provide a second stiffness that is less than the first stiffness.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
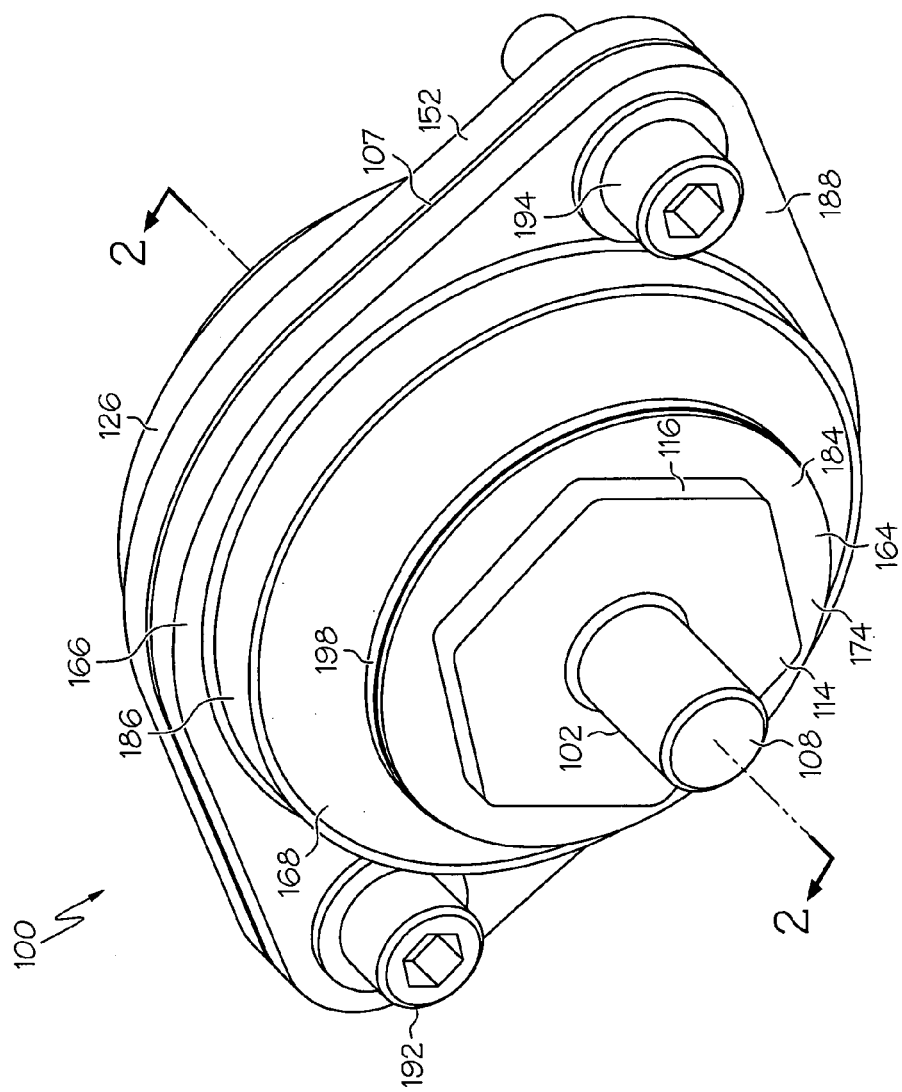
FIG. 1 is a perspective view of a vibration isolation apparatus, according to an embodiment.
Figure 2:
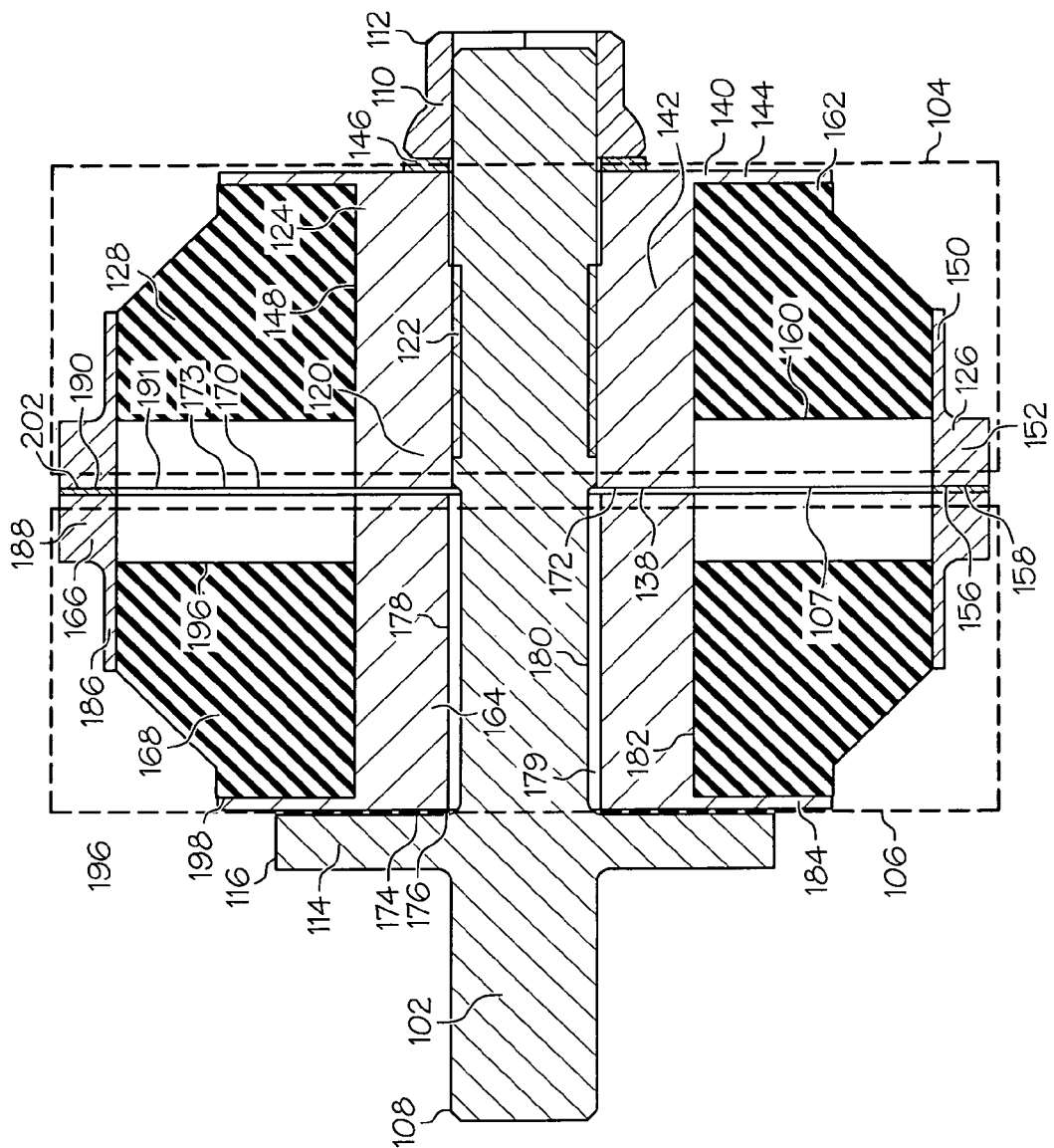
FIG. 2 is a cross-sectional side view of a vibration isolation apparatus, according to an embodiment.

FIG. 1 is a perspective view of a vibration isolator 100, and FIG. 2 is a cross section view of the vibration isolator 100 of FIG. 1 taken along line 1-1, according to an embodiment. The vibration isolator 100 includes a shaft 102, a first mount section (indicated by dotted box 104 in FIG. 2) mounted to the shaft 102, a second mount section (indicated by dotted box 106 in FIG. 2) disposed on the shaft 102, and a shim 107 separating the two mount sections 104, 106. The shaft 102 may serve as a tie-rod to which components of the vibration isolator 100 are mounted. To support the components of the vibration isolator 100, the shaft 102 may include material capable of maintaining structural integrity when subjected to vibrations having frequencies of up to about 20,000 Hz, in an embodiment. In another embodiment, the shaft 102 may include material capable of maintaining structural integrity when exposed to temperatures in a range of from about −40° C. to about 100° C. Suitable materials include, but are not limited to steel, aluminum, or titanium. The particular materials selected for the shaft 102 may depend on an environment to which the vibration isolator 100 may be exposed.

With reference to FIG. 2, the shaft 102 has a first end 108 and a second end 110. The first end 108 of the shaft 102 is adapted to couple to a structure to be isolated (not shown). In one example, the structure to be isolated may be a payload, a satellite, or a sensitive spacecraft component, and the first end 108 may be configured accordingly to attach thereto. According to an embodiment, the structure to be isolated may have an opening and the first end 108 may have an outer diameter that is substantially equal to (e.g., ±0.05 mm) the diameter of the structure opening. For example, the structure to be isolated may be relatively small and may have an opening that accommodates a first end 108 having an outer diameter in a range of from about 0.1 cm to about 1 cm. In other embodiments, the outer diameter of the first end 108 may be more or less than the aforementioned range. The second end 110 of the shaft 102 may be configured to retain the components on the shaft 102. In this regard, the second end 110 may include threading that corresponds with threading on a nut 112, in an embodiment. In an alternate embodiment, the second end 110 may have an enlarged outer diameter relative to an adjacent portion of the shaft 102. In such case, the outer diameter of the second end 110 may have a measurement in a range of from about 0.1 cm to about 1 cm. In other embodiments, the second end 110 may have a larger or smaller outer diameter, and the outer diameter measurement may depend on a sizing of an opening through the nut 112.

In accordance with an embodiment, the shaft 102 may also include a radial plate 114, which may be configured to maintain the axial positions of the first and second mount sections 104, 106 relative to the length of the shaft 102. In an embodiment, the radial plate 114 extends radially outwardly from the shaft 102 between the first and second ends 108, 110 of the shaft 102. According to one embodiment, the radial plate 114 may be positioned closer to the first end 108 than the second end 110. In another embodiment, the radial plate 114 may be positioned substantially equidistant from (e.g., within about ±0.05 millimeters difference from) both the first and the second ends 108, 110. In still other embodiments, the radial plate 114 may be located closer to the second end 110 than the first end 108. Regardless of the particular positioning, the radial plate 114 may be integrally formed with or coupled to the shaft 102, such as by welding and the like. The radial plate 114 may be comprised of material that is substantially similar or that has similar properties to the material of the shaft 102.

The radial plate 114 may have an outer radial surface 116 having a generally polygonal, circular, ovular, or other shape. For example, as shown in FIG. 1, the outer radial surface 116 may be hexagonal. Other shapes may be suitable for the outer radial surface 116, in other embodiment. In an embodiment, the outer radial surface 116 may have a diameter that is suitable for preventing components of the second mount section 106 from sliding axially beyond a predetermined axial location on the shaft 102. In this regard, the diameter of the outer radial surface 116 may be in a range of from about 0.25 cm to about 2.5 cm. However, the outer radial surface 116 may be greater or smaller in other embodiments. In embodiments in which the diameter of the outer radial surface 116 is smaller than a diameter of an adjacent component of the second mount section 106, a washer (not shown) or other plate-like component configured to have a diameter that is greater than that of the outer radial surface 116 may be employed.

Returning to FIG. 2, in another embodiment, the shaft 102 may additionally include a radial projection 120 extending therefrom. The radial projection 120 may be configured to fix the components of the first mount section 104 at an axial position on the shaft 102 and may be integrally formed with the shaft 102, in an embodiment. In another embodiment, the radial projection 120 may be a separate piece that is coupled to the shaft 102, such as by welding and the like. The radial projection 120 may extend radially outwardly from the shaft 102 at an axial location between the radial plate 114 and the second end 110. The radial projection 120 may have an outer diameter that is substantially equal to a diameter of an opening 122 through a mounting component of the first mount section 104 (e.g., bushing 124, which will be described in more detail below). For example, the outer diameter of the radial projection 120 may be in a range of from about 0.11 cm to about 1.1 cm, and the opening 122 of the bushing 124 may have a corresponding opening diameter measurement. In other embodiments, the outer diameter of the radial projection 120 may be larger or smaller than the previously-mentioned range. In another embodiment, the outer diameter of the radial projection 120 may be smaller than that of the bushing opening 122, in which case, an intermediate mounting component (not shown) may be included between the radial projection 120 and the bushing 124.

To further secure the first mount section 104 to the shaft 102, the second end 110 of the shaft 102 may have an outer diameter that is substantially equal to the diameter of the mounting component opening 122, in an embodiment. For example, the outer diameter of the second end 110 may be in a range of from about 0.1 cm to about 1.0 cm, and the opening 122 of the bushing 124 may have a corresponding opening diameter measurement. In still other embodiments, the outer diameter of the second end 110 may be larger or smaller than the previously-mentioned range. In one embodiment, the second end 110 may have an outer diameter that is substantially equal to the outer diameter of the radial projection 120, however, in other embodiments, the outer diameters may not be equal. In still other embodiments, the outer diameter of the second end 110 may be smaller than that of the mounting component opening 122, and an intermediate mounting component (not shown) may be included that may be disposed between the shaft 102 and the mounting component.

The first mount section 104 and the second mount section 106 are configured to provide the vibration isolation apparatus 100 with multi-mode capabilities (i.e. different stiffness and damping characteristic at different vibration amplitude levels). To do so, the first mount section 104 is configured to have a first stiffness and damping operating in a first mode of vibration, and the second mount section 106 is configured to have a second stiffness and damping while operating in a second mode of vibration. The first mode of vibration may be low amplitude vibration, while the second mode of vibration may be large amplitude vibration. In an embodiment, the first stiffness and damping are lower than the second stiffness and damping. In other embodiments, the first and second stiffness and damping are similar. In any case, the isolation system resonant frequency (i.e. isolation mount and payload together) resulting from the first stiffness and damping may be lower in frequency than the isolation system resonant frequency resulting from the second stiffness and damping. In one embodiment, the first stiffness may be in a range of from about 3 lbf/in to about 300 lbf/in, when the first frequency range includes values from about 1 Hz to about 10 Hz, and the second stiffness may be in a range of from about 1200 lbf/in to about 11000 lbf/in, when the second frequency range includes values from about 20 Hz to about 60 Hz. In other embodiments, the stiffness values for the first and second mount sections 104, 106 may be greater than or less than the aforementioned range and the particular values may depend on a configuration of the structure to be damped and a particular vibration experienced by the structure.

With continued reference to FIG. 2, to provide the first mount section 104 with an ability to provide a first stiffness and first damping for a first mode of vibration, the first mount section 104 is fixed to the shaft 102 in the manner described above via the first bushing 124 and includes a first outer annular member 126 and a first elastomeric member 128. Because the first bushing 124 is coupled to the shaft 102 at a fixed location, the first bushing 124 may be made of a rigid material, such as aluminum, or another material in other embodiments. In accordance with an embodiment, the first bushing 124 includes the opening 122 described above, a cylindrical section 142 and a flange 144. The opening 122 may have a uniform diameter along its axial length, in an embodiment, but may alternatively have a varying diameter in other embodiments.

The cylindrical section 142 extends between a first end 138 and a second end 140 of the first bushing 124 and may have an outer diameter in a range of from about 0.2 cm to about 3 cm. The particular outer diameter may depend on a desired overall dimension of the isolator 100. The flange 144, which extends radially outwardly from the second end 140 of the first bushing 124, has an outer diameter that is greater than that of the cylindrical section 142, according to an embodiment. In another embodiment, the flange 144 has an outer diameter that is larger than an outer diameter of the nut 112. For example, the outer diameter of the flange 144 may be in a range of from about 0.3 cm to about 4 cm, in an embodiment. In other embodiments, the outer diameter of the flange 144 but may be larger or smaller. In either case, a washer 146 may be disposed between the second end 140 and the nut 112, in order to provide flat surfaces with which each can contact. The washer 146 may have an outer diameter that is larger or smaller than the outer diameters of either the flange 144 or the nut 112. The flange 144 may have a generally circular shape, although it may have a different shape in other embodiments.

Referring to FIGS. 1 and 2, the first outer annular member 126 is concentric to the shaft 102 and disposed around the first bushing 124 to position the first elastomeric member 128 against an outer surface 148 of the first bushing 124. According to an embodiment, the first outer annular member 126 may include a rigid material capable of maintaining structural integrity while subjected to vibrations that may be experienced by the isolator without substantially interfering with the stiffness and damping capabilities of the first elastomeric member 128. Suitable materials include, but are not limited to aluminum, steel, and titanium. The first outer annular member 126 has a ring section 150 and a mounting flange 152. The ring section 150 has an inner diameter that is suitable for accommodating an outer diameter of the first elastomeric member 128. In an embodiment, the inner diameter of the ring section 150 is in a range of from about 0.4 cm to about 5 cm. However, the particular inner diameter dimensions may be larger or smaller in other embodiments. The mounting flange 152 extends radially outwardly from the ring section 150 and may be adapted to provide a surface for attaching the vibration isolator 100 to another member not shown (e.g. spacecraft structure) and for attaching the first mount section 104 to the second mount section 106. In particular, the mounting flange 152 may define an attachment face 156 on an end 158 of the first outer annular member 126 that is positioned toward the first end 108 of the shaft 102.

The first elastomeric member 128 may be configured to have a particular stiffness and damping. For example, the particular stiffness and damping of the first elastomeric member 128 may be substantially equal to the first stiffness and first damping of the first mount section 104. In an embodiment, the first elastomeric member 128 may comprise a material having the particular stiffness and damping (e.g., the first stiffness and first damping), in one embodiment. Suitable materials for providing the particular stiffness and damping include, but are not limited to, rubber, polymers, viscoelastics, and other elastomeric materials. In another embodiment, the first elastomeric member 128 may be shaped to provide the particular stiffness. In an example, the first elastomeric member 128 has a first end 160 and a second end 162, wherein the first end 160 has a larger outer diameter than the second end 162. According to an embodiment, the first elastomeric member 128 may have a truncated dome shape. In other embodiments, the first elastomeric member 128 may have a frusto-conical shape, or a generally concave outer surface shape. In accordance with another embodiment, the first elastomeric member 128 may have an inner surface that forms a cavity with the first bushing 124, as shown in FIG. 2. Alternatively, the first elastomeric member 128 may be a solid piece of material. It will be appreciated, however, that whether the first elastomeric member 128 is solid or hollow may depend on the desired stiffness to be provided by the first mount section 104.

In any case, the first end 160 of the first elastomeric member 128 having the larger diameter is positioned adjacent to and may abut the mounting flange 152 of the first bushing 124. Additionally, in a preferred embodiment, the second end 162 is positioned radially inwardly from the ring section 150 of the first outer annular member. In one example, as shown in FIG. 1, the first end 160 of the first elastomeric member 128 may be disposed such that it does not extend axially past an axial location of the first outer annular member 126 from which the mounting flange 152 thereof radially extends.

To provide the second mount section 106 with a second stiffness and second damping for the second vibration mode, the second mount section 106 includes components that are disposed around the shaft 102 and are capable of moving axially and radially relative to the shaft 102, in response to axial movement of the first mount section 104. In one embodiment, the second mount section 106 includes a second bushing 164, a second outer annular member 166, and a second elastomeric member 168. The second bushing 164 is positioned between the first bushing 124 and the radial plate 114 of the shaft 102 such that a radial gap and one or more axial gaps and clearances may be present therebetween. In an embodiment, a first end 170 of the second bushing 164 is disposed adjacent to and is spaced apart from the first end 138 of the first bushing 124 to form a first axial gap 172. The first axial gap 172 may have an axial length in a range of from about 0.254 mm to about 0.508 mm, in an embodiment. However, depending on overall dimensions of the isolator 100, the first axial gap 172 may be larger or smaller than the aforementioned range. According to another embodiment, a second end 174 of the second bushing 164 may be disposed adjacent to the radial plate 114 to form an axial clearance 176 therewith. The axial clearance 176 may have an axial length that is configured such that the axial clearance is not reduced to zero for the vibration environment that the first mount section 104 is sized for. In an embodiment, the resonant frequency of the second mode may be in a range of about 40 Hertz to about 80 Hertz, and the axial clearance 176 may be in a range of from about 0.254 mm to about 0.508 mm. In one embodiment, the axial clearance 176 may be substantially equal to (e.g., ±0.01 mm) the first axial gap 172. In other embodiments, the axial clearance 176 may be greater than or smaller than the first axial gap 172. However, the particular dimension of the axial clearance 176 may also depend on overall dimensions of the isolator 100.

In accordance with an embodiment, the second bushing 164 has an opening 178 with a diameter that is larger than the outer diameter of the shaft 102 to form the radial gap 179 between an inner surface 180 of the second bushing 164 and the shaft 102. In accordance with an embodiment, the radial gap 179 may have a radial length in a range of from about 0.254 mm to about 0.508 mm. In other embodiments, the particular radial length of the radial gap 179 may be larger or smaller than the aforementioned range. Although both diameter of the opening 178 and the outer diameter of the shaft 102 appear to have a uniform diameter along the axial length of the second bushing 164, in other embodiments, the two may have varying diameters, as long as the radial gap 179 is maintained therebetween.

The second bushing 164 may be made up of a cylindrical section 182 and a flange 184, in an embodiment. The cylindrical section 182 extends between the first and second ends 173, 174 and may have an outer diameter in a range of from about 0.2 cm to about 3 cm, which in an embodiment, may be substantially similar to that of the first bushing 124. However, the particular outer diameter of the cylindrical section 182 of the second bushing 164 may depend on a desired overall dimension of the isolator 100. The flange 184 is disposed on the second end 174 and extends radially outwardly therefrom. In an embodiment, the flange 184, which has an outer diameter that is greater than that of the cylindrical section 182, may also have an outer diameter that is larger than an outer diameter of the radial plate 114. For example, the outer diameter of the flange 184 may be in a range of from about 0.3 cm to about 4 cm, in an embodiment. In other embodiments, the outer diameter of the flange 184 but may be larger or smaller than the aforementioned range. Although the flange 184 may have a generally circular shape, it may have a different shape in other embodiments.

In accordance with an embodiment, the second bushing 164 may be made of a rigid material, such as aluminum, or another material in other embodiments. The second bushing 164 may be made of material that is substantially similar to that of the first bushing 124, in an embodiment. In other embodiments, the materials of the bushings 124, 164 may be different but may have similar physical properties.

The second outer annular member 166 is concentric to the shaft 102 and positioned between the first outer annular member 126 and the radial plate 114. In accordance with an embodiment, the second outer annular member 166 may also be disposed around the second bushing 164 to position the second elastomeric member 168 against the second bushing 164. According to an embodiment, the second outer annular member 166 may include a rigid material capable of maintaining structural integrity while subjected to vibrations that may be experienced by the isolator without substantially interfering with the stiffness and damping capabilities of the second elastomeric member 168. Suitable materials include, but are not limited to aluminum, steel, or titanium. In an embodiment, the second outer annular member 166 may be made of material that is substantially identical to that of the first annular member 126. In other embodiments, the materials of the members 126, 166 may be different but may have similar physical properties.

The second outer annular member 166 may include a ring section 186 and a mounting flange 188, in an embodiment. The ring section 186 has an inner diameter that corresponds with an outer diameter of the second elastomeric member 168. In one embodiment, the inner diameter of the ring section 186 is in a range of from about 0.4 cm to about 5 cm. However, the particular diameter may depend on the dimensions of the second elastomeric member 168. The mounting flange 188 extends radially outwardly from the ring section 186 and has dimensions and a shape that corresponds with the mounting flange 152 of the first outer annular member 126. For example, the mounting flange 188 of the second outer annular member 166 has an attachment face 190 that is positioned toward and has a shape that corresponds with the attachment face 156 of the first outer annular member 126. The two attachment faces 190, 156 are spaced apart to form a second axial gap 191. The second axial gap 191 may have an axial length that is substantially equal to (e.g., ±0.05 mm) to that of the first axial gap 172. In other embodiments, the two gaps 191, 172 may not be equal. In any case, the second axial gap 191 may be in a range from about 0.254 mm to about 0.508 mm. In other embodiments, the gap 191 may be larger or smaller than the aforementioned range. In an embodiment, an outer periphery of the two mounting flanges 188, 152 are secured to each other by two or more bolts 192, 194 (FIG. 1). In other embodiments, the mounting flanges 188, 152 may be attached via clamps or other coupling mechanisms.

The second mount section 106, which includes the second elastomeric member 168, may be configured to have a particular stiffness and damping. In an embodiment, the particular stiffness and damping may be substantially equal to the second stiffness and second damping of the second mount section 106. In other embodiments, the particular stiffness and damping may be more than or less than the second stiffness and second damping of the second mount section 106. In any case, the second elastomeric member 168 may comprise a material having the particular stiffness and damping. Suitable materials include, but are not limited to, rubber, polymers, viscoelastics, or other elastomeric materials. In another embodiment, the second elastomeric member 168 may be shaped to provide the particular stiffness. In one example, the second elastomeric member 168 has a first end 196 and a second end 198, wherein the second end 198 has a smaller outer diameter than the first end 196. According to an embodiment, the second elastomeric member 168 may have a shape that substantially similar to that of the first elastomeric member 128 so that when the two members 128, 168 are appropriately positioned adjacent to each other, they may appear to be mirror images of each other. For example, in an embodiment in which the first elastomeric member 128 has a truncated dome shape, the second elastomeric member 168 may also have a truncated dome shape. Alternatively, if the first elastomeric member 128 has a frusto-conical shape, the second elastomeric member 168 may have the same shape. In other embodiments, the second elastomeric member 168 may have a generally concave outer surface shape that may or may not be similar to that of the first elastomeric member 128. In accordance with another embodiment, the second elastomeric member 168 may have an inner surface that forms a cavity with the second bushing 164, as shown in FIG. 1, similar to the first elastomeric member 128. However, in other embodiments, the second elastomeric member 168 may be a solid piece of material, while the first elastomeric member 128 may be hollow, or the two members 128, 168 may both be solid members. In any case, whether the second elastomeric member 168 is solid or hollow may depend on the desired stiffness and damping to be provided by the second mount section 106, and the components of the adjacent first mount section 104.

The second end 198 of the second elastomeric member 168 having the smaller diameter is positioned adjacent to and may abut the flange 184 of the second bushing 164. In a preferred embodiment, the first end 196 is positioned radially inwardly from the ring section 186 of the second outer annular member 166 without extending axially past the attachment face 190 thereof. In this way, the first ends 160, 196 of the first and the second elastomeric members 128, 168 are spaced apart from each other to form a second axial gap 202. In one embodiment, the second axial gap 202 may have an axial length in a range of from about 0.0254 cm to about 0.508 cm. In other embodiments, the second axial gap 202 may be larger or smaller than the aforementioned range.

The shim 107 is located between annular member 126 and annular member 166, and is configured to provide appropriate spacing between the first and second mount sections 104, 106 to maintain the axial lengths of the first and second axial gaps 172, 191 in the isolator 100. In this regard, the shim 107 is disk-shaped and is disposed between the attachment face 156 of the first outer annular member 126 and the attachment face 190 of the second outer annular member 166. According to an embodiment, the shim 107 may be disposed between the first and second elastomeric members 128, 168 also. Although the shim 107 is shown as a single disk, the shim 107 may alternatively be made up of more than one component.

The shim 107 may have a uniform thickness, in embodiments in which the first and second axial gaps 172, 191 are substantially equal to each other. In other embodiments, the shim 107 may have a varying thickness. In such case, the locations of the varying thickness may depend on the locations of the first and second axial gaps 172, 191 when the isolator 100 is assembled. Suitable materials that may be included in the shim 107 are aluminum, steel, or titanium.

During operation, vibration from an attached structure may be transmitted to the isolator 100 via the shaft 102. When the isolator 100 is subjected to vibrations in a first mode (i.e., when the structure has small amplitude vibration representative of an on-orbit vibration environment) the first mount section 104 may react and provide the desired stiffness and damping for this vibration environment. In particular, vibrations may travel through the shaft 102 to the first elastomeric member 128, which may be configured to provide the desired stiffness and damping for the low amplitude first mode of vibration. If the isolator 100 is subjected to vibrations in a second vibration mode (i.e., when the structure has larger amplitude vibration representative of a launch vibration environment), the second mount section 106 cooperates with the first mount section 104, acting in parallel to provide adequate stiffness and damping for the larger amplitude vibration environment. Specifically, the vibrations from the shaft 102 may be transmitted to the second elastomeric member 168 and as the amplitude increases beyond that which the first mount section 104 is capable of, the shaft 102 may move the first mount section 104 toward the second mount section 106 and the second mount section 106 may move axially along the shaft 102 to thereby isolate and/or damp the vibrations. Because the first and second axial gaps 172, 191 are provided between the first and second mount sections 104, 106 and the shim 107 is disposed in the gaps 172, 191, the first and the second elastomeric members 128, 168 may be maintained separate from each other and thus, may be capable of providing different stiffness and damping characteristics for the different vibration modes (i.e. small amplitude vibrations and large amplitude vibrations). By providing the axial clearance between the second mount section 106, and the first mount section 104, the second mount section 106 may be capable of attenuating vibrations in the second mode of vibration having higher amplitudes than those that may be experienced when the isolator 100 vibrates in the first mode.

Hence, a vibration isolation apparatus has now been provided that may function (i.e. provide desired stiffness and damping properties) for multiple modes (i.e. amplitude levels) of vibration. The vibration isolation apparatus may be relatively inexpensive and simpler to manufacture, as compared to conventional vibration isolation apparatus. Additionally, the vibration isolation apparatus may be easily constructed to occupy a footprint that is substantially equal to or less than that of conventional isolation mount and thus, may be retrofitted into existing systems that may experience vibrations that may need to be isolated and/or damped.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A vibration isolator, comprising:
    a shaft having a first end and a second end, the shaft including a radial plate extending radially outwardly from the shaft and disposed between the first end and the second end;
    a first bushing mounted to the shaft at an axial position between the radial plate and the second end of the shaft, the first bushing having a first end and a second end, the second end of the first bushing including a flange extending radially outwardly therefrom;
    a second bushing disposed on the shaft and positioned between the radial plate and the first bushing, the second bushing having a first end, a second end, and an opening extending between the first end and the second end, the first end of the second bushing spaced apart from the second end of the first bushing to form a first axial gap, the second end including a flange extending radially outwardly therefrom and positioned adjacent to the radial plate forming an axial clearance therewith, and the opening having a diameter that is greater than a diameter of the shaft such that a radial gap is formed between the second bushing and the shaft;
    a first outer annular member disposed concentric to the first bushing and having an attachment face;
    a second outer annular member disposed concentric to the second bushing and having an attachment face that is spaced apart from the attachment face of the second outer annular member to form a second axial gap;
    a first elastomeric member disposed concentric to the shaft between the first outer annular member and the first bushing, the first elastomeric member having a first end and a second end, the first end of the first elastomeric member abutting the flange of the first bushing;
    a second elastomeric member disposed concentric to the shaft between the second outer annular member and the second bushing, the second elastomeric member having a first end and a second end, the first end of the second elastomeric member abutting the flange of the second bushing; and
    a shim disposed between the second end of the first bushing and the second end of the second bushing and between the attachment face of the first outer annular member and the attachment face of the second outer annular member, the shim having a portion having a first thickness and a portion having a second thickness, the first thickness being substantially equal to an axial length of the first axial gap, and the second thickness being substantially equal to an axial length of the second axial gap.
    wherein the first elastomeric member is adapted to provide a first stiffness for damping a first vibration, and the second elastomeric member is adapted to provide a second stiffness for damping a second vibration, the second stiffness being greater than the first stiffness.

2. The vibration isolator of claim 1, wherein the radial gap has a radial length in a range of from about 0.254 mm to about 0.508 mm.

3. The vibration isolator of claim 1, wherein the first axial gap has an axial length in a range of from about 0.254 mm to about 0.508 mm.

4. The vibration isolator of claim 3, wherein the second axial gap has an axial length in a range of from about 0.254 mm to about 0.508 mm.

5. The vibration isolator of claim 3, wherein the first axial gap and the second axial clearance are substantially equal to each other.

6. The vibration isolator of claim 1, wherein the axial clearance has an axial length in a range of from about 0.254 mm to about 0.508 mm.

7. The vibration isolator of claim 1, wherein the first elastomeric member is dome-shaped and the second end of the first elastomeric member has an outer diameter that is less than an outer diameter of the first end of the first elastomeric member.

8. The vibration isolator of claim 7, wherein the second elastomeric member is dome-shaped and the second end of the second elastomeric member has an outer diameter that is less than an outer diameter of the first end of the second elastomeric member.

9. The vibration isolator of claim 1, wherein the shaft includes a radial projection extending therefrom and disposed at an axial location on the shaft between the radial plate and the second end, and the second bushing is disposed on the radial projection.

10. The vibration isolator of claim 1, wherein the first elastomeric member and the second elastomeric member comprise substantially similar materials.

11. The vibration isolator of claim 1, wherein the first elastomeric member and the second elastomeric member comprise rubber.

12. A vibration isolator, comprising:
    a shaft having a first end and a second end, the shaft including a radial plate extending radially outwardly from the shaft and disposed between the first end and the second end;
    a first mount section coupled to the shaft between the radial plate and the second end of the shaft, the first mount section including:
        a first bushing mounted to the shaft at an axial position between the radial plate and the second end of the shaft, the first bushing having a first end and a second end, the second end of the first bushing including a flange extending radially outwardly therefrom,
        a first outer annular member disposed concentric to the first bushing and having an attachment face, and
        a first elastomeric member disposed concentric to the shaft between the first outer annular member and the first bushing, the first elastomeric member having a first end and a second end, the first end of the first elastomeric member abutting the flange of the first bushing;
    a second mount section disposed on the shaft between the first mount section and the radial plate, the second mount section including:
        a second bushing disposed on the shaft and positioned between the radial plate and the first bushing, the second bushing having a first end, a second end, and an opening extending between the first end and the second end, the first end of the second bushing spaced apart from to the second end of the first bushing to form a first axial gap, the second end including a flange extending radially outwardly therefrom and positioned adjacent to the radial plate forming an axial clearance therewith, and the opening having a diameter that is greater than a diameter of the shaft such that a radial gap is formed between the second bushing and the shaft,
- a second outer annular member disposed concentric to the second bushing and having an attachment face that is spaced apart from the attachment face of the second outer annular member to form a second axial gap, and
- a second elastomeric member disposed concentric to the shaft between the second outer annular member and the second bushing, the second elastomeric member having a first end and a second end, the first end of the second elastomeric member abutting the flange of the second bushing; and
- a shim disposed between the second end of the first bushing and the second end of the second bushing and between the attachment face of the first outer annular member and the attachment face of the second outer annular member, the shim having a portion having a first thickness and a portion having a second thickness, the first thickness being substantially equal to an axial length of the first axial gap, and the second thickness being substantially equal to an axial length of the second axial gap,
- wherein the first elastomeric member is adapted to provide a first stiffness, and the second elastomeric member is adapted to provide a second stiffness that is less than the first stiffness.

13. The vibration isolator of claim 12, wherein the radial gap has a radial length in a range of from about 0.254 mm to about 0.508 mm.

14. The vibration isolator of claim 12, wherein the first axial gap has an axial length in a range of from about 0.254 mm to about 0.508 mm.

15. The vibration isolator of claim 14, wherein the second axial gap has an axial length in a range of from about 0.254 mm to about 0.508 mm.

16. The vibration isolator of claim 14, wherein the first axial gap and the second axial clearance are substantially equal to each other.

17. The vibration isolator of claim 12, wherein the axial clearance has an axial length in a range of from about 0.254 mm to about 0.508 mm.

18. The vibration isolator of claim 12, wherein:
- the first elastomeric member is dome-shaped and the second end of the first elastomeric member has an outer diameter that is less than an outer diameter of the first end of the first elastomeric member, and
- the second elastomeric member is dome-shaped and the second end of the second elastomeric member has an outer diameter that is less than an outer diameter of the first end of the second elastomeric member.

19. The vibration isolator of claim 12, wherein the shaft includes a radial projection extending therefrom and disposed at an axial location on the shaft between the radial plate and the second end, and the second bushing is disposed on the radial projection.

* * * * *